United States Patent [19]

Schumacher

[11] Patent Number: 4,890,501
[45] Date of Patent: Jan. 2, 1990

[54] TORQUE TRANSDUCER FOR ELECTRIC MOTORS

[76] Inventor: Larry L. Schumacher, 18876 Tenderfoot Trail, Newhall, Calif. 91321

[21] Appl. No.: 327,788
[22] Filed: Mar. 23, 1989
[51] Int. Cl.⁴ .............................................. G01L 3/14
[52] U.S. Cl. ................................. 73/862.33; 310/68 B
[58] Field of Search ............ 73/862.29, 862.33, 862.32, 73/862.34; 310/68 B; 318/475, 488

[56] References Cited

U.S. PATENT DOCUMENTS 4,492,906 1/1985 Goto et al. .......................... 310/68 B

*Primary Examiner*—Charles A. Ruehl

[57] ABSTRACT

The invention is a mechanism that measures, at any rotational speed, the torque transmitted from an electric motor rotor to an motor shaft and transfers the electrical characteristics representing the measured motor torque to slip rings external to the motor housing. The motor housing supports the motor shaft in bearings. The motor rotor is attached to the motor shaft by torsionally compliant structure, and the motor rotor is radially supported relative to the motor shaft by bearings which maintain the motor air gap when the torsionally compliant structure deforms. The rotational angular deformation of the torsionally compliant structure is measured by deformation measurement means within the motor housing. Electrical conductors are passed through a spacer in the form of a cylindrical shaft sleeve between the motor shaft and one of the motor bearing races to slip rings external to the motor housing. The angular deformation between the motor rotor and motor shaft is transformed to a voltage proportional to torque by an electronic circuit.

8 Claims, 1 Drawing Sheet

U.S. Patent    Jan. 2, 1990    4,890,501
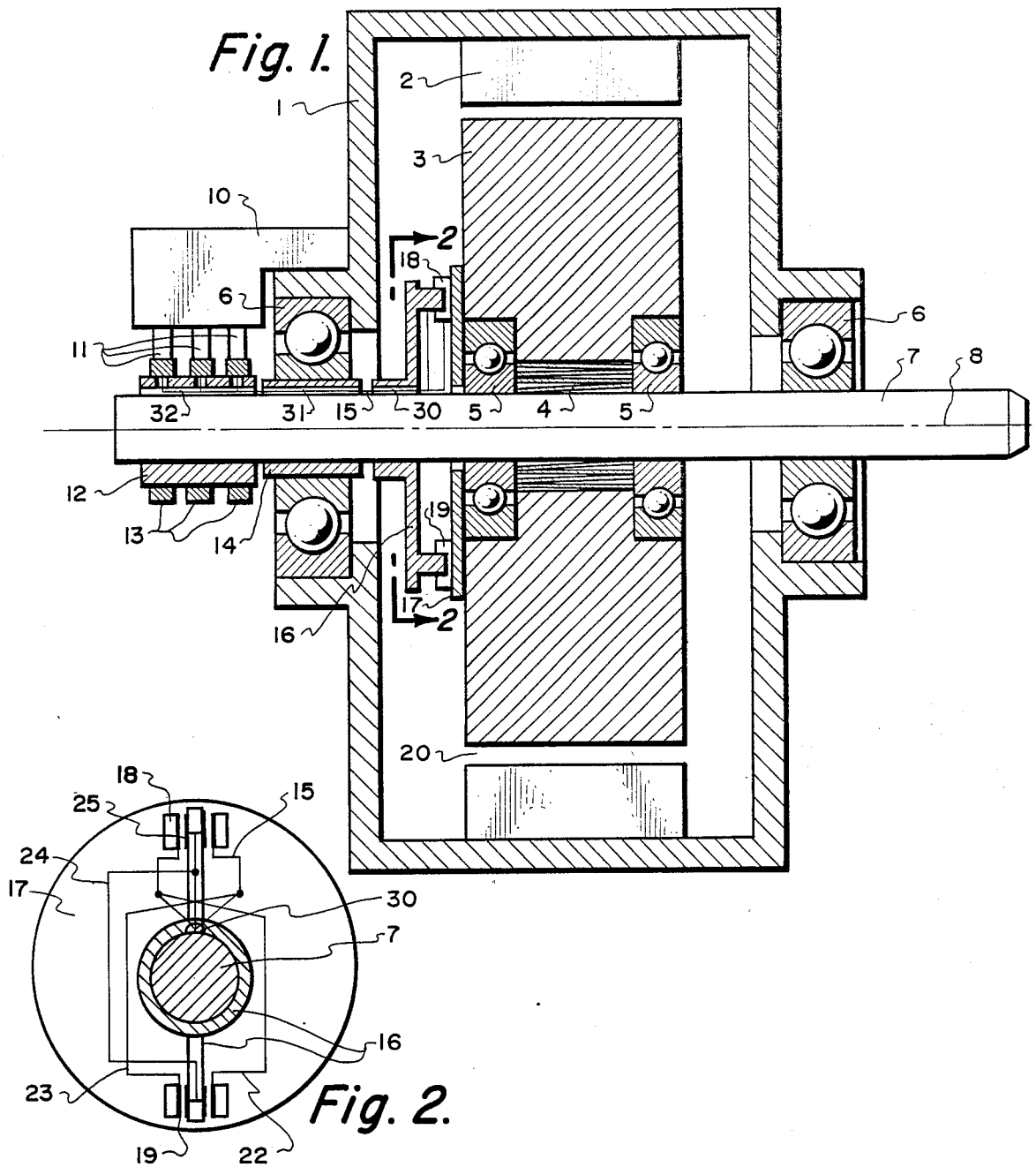
Fig. 1.
Fig. 2.
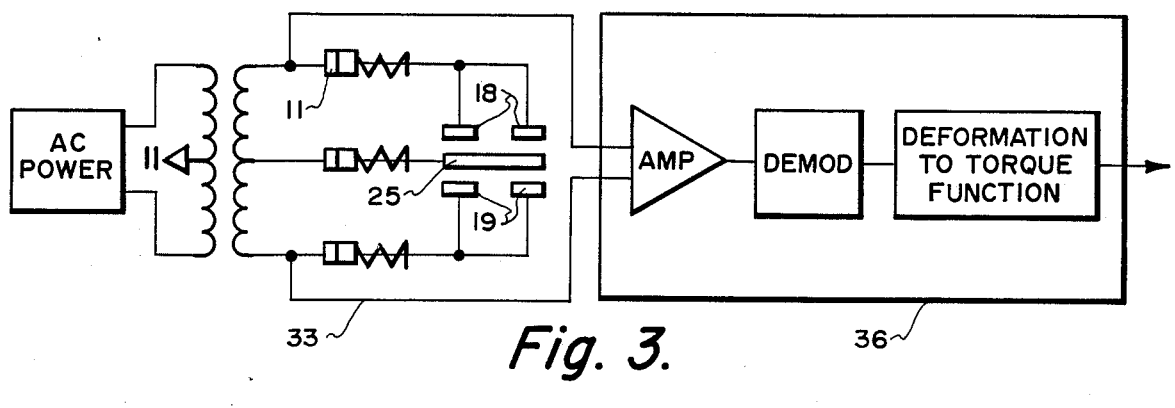
Fig. 3.

TORQUE TRANSDUCER FOR ELECTRIC MOTORS

FIELD OF THE INVENTION

This invention relates to torquemeters for continuously determining electric motor torque transmitted to a rotating load.

BACKGROUND OF THE INVENTION

Torque produced by electric motors is generally sensed external to the motor in the torque transmission path between the electric motor and the torsionally driven load. Most applications sense the angular deformation of the torquing shaft or the angular deformation of a torsionally complient element in the torque path to the load. Additionally, most existing torque transducers are not dymamically balanced to be compatible with the high rotational shaft speeds in most electric motors.

Accordingly, it is the object of this invention to provide an improved electric motor torque tranducer that will:
  operate within the eleectric motor housing;
  preserve the precision air gap between the motor rotor and stator; and
  transfer the electric characeristics representing motor torque to slip rings.

SUMMARY OF THE INVENTION

The invention is a mechanism that measures, at any rotational speed, the torque transmitted from the electric motor rotor to the motor shaft and transfers the electrical characteristics representing the measured motor torque to slip rings external to the motor housing.

In an electric motor, the motor housing supports the motor stator and the motor shaft bearings. In the invention, the motor rotor is rotationally attached to the motor shaft by torsionally complient structure, and additionally the motor rotor is radially supported relative to the motor shaft by bearings which maintain the motor air gap when the torsionally complient structure deforms.

The invention's motor stator torques the motor rotor which is attached to the motor shaft through a torsionally complient structure. The rotational angular deformation of the torsionally complient structure is a function of the torque between the motor shaft and rotor and is measured by a deformation measurement means. Bearings also support the motor rotor on the motor shaft to prevent the rotational deformation of the torsionally complient structure from causing radial deformation of the torsionally complient structure thus preserving the motor air gap.

The deformation measurement means is within the motor housing and has structure attached to the motor shaft and structure attached to the motor rotor, and each structure has electrical elements attached. Electrical conductors attached to the electrical elements are passed through a spacer to slip rings external to the motor housing. The spacer is in the form of a cylindrical shift sleeve between the motor shaft and one of the motor bearing races with axial passages for conductors.

The angular deformation between the motor rotor and motor shaft is transformed to electrical characteristics by capacitive elements attached to rotationally balanced deformation measurement structures attached to both the motor rotor and the motor shaft. The capacitive electrical characteristics are transformed to a voltate proportional to torque by an electronic circuit. The described objects and advantages of the torque transducer for electric motors will become more apparent in the following detailed description.

BRIEF DESCRIPTION OF THE DRAWINGS

FIG. 1 is a section view of the preferred embodiment of the torque transducer for electric motors.

FIG. 2 is an end view of the preferred embodiment of the rotationally balanced deformation measurement means.

FIG. 3 is an electrical schematic of the preferred embodiment of the electronic circuit.

DETAILED DESCRIPTION OF THE INVENTION

FIGS. 1 and 2 illustrates the torque transducer for electric motors. The motor housing 1 supports motor stator 2 and motor shaft 71 in support bearings 6. The torsion spring 4 is torsionally complient structure cylindrically attached to rotor 3 and cylindrically attached to motor shaft 7.

Stator 2 torques the rotor 3 across a uniform cylindrical air gap 20, and rotor 3 torques shaft 7 through spring 4 rotationally deforming spring 4 around axis 8, the deformation resulting from the torque transferred from rotor 3 to shaft 7. Bearings 5 supports rotor 3 relative to shaft 7 to prevent radial deformation of spring 4 and preserve air gap 20.

Rotational angular deformation of spring 4 around axis 8 is measured with a rotationally balanced torsional spring deformation measurement means consisting of reference structure 17 attached to rotor 3 and pointer structure 16 attached to shaft 7. The mass center of reference structure 17 and mass center of pointer structure 16 is on axis 8. Electrical capacitive surfaces 18 insulatingly attached to reference structure 17 are connected by electrically conductive wire 22, electrical capacitive surfaces 19 insulating attached to reference structure 17 are connected by electrically conductive wire 23, and electrical capacitive surfaces 25 insulating attached to pointer structure 16 are connected by electrically conductive wire 24. All conductors 15 going to slip rings 13 pass through passage 30 in structure 16, passage 31 in structure 14 and passage 32 in structure 12, passages 30,31,32 are cylindrical openings approximately parallel to axis 8 in structures attached to shaft 7 providing a passage for conductors 15 from deformation means to slip rings 13.

Angular deformation between reference structure 17 and pointer structure 16 is transformed to electrically measurable characteristics by the differential electrical capacitance between capacitive elements 18 and 19, which is converted into an electrical signal proportional to the torque between motor rotor 3 and motor shaft 7 by circuit 36 (see FIG. 3).

FIGS. 1 and 3 illustrates that electrical power and signals are transmitted to and from the electrical capacitive elements 18,19,25 by conductive slip rings 13 attached to shaft 7 by insulating structure 12. Electrically conductive brushes 11 are constrained from rotation by brush holder 10 attached to motor housing 1. Electrically conductive means 33 connects brushes 11 to electronic circuit 36 that transforms electrical characteristics of elements 18,19,25 into a voltage representing the electric motor torque.

Having described the invention I claim:

1. An improved torque transducer for electric motors of the type with a motor stator attached to a motor housing, the motor housing supporting in shaft support bearings a motor shaft attached to a motor rotor, the motor rotor being rotationaly separated from the motor stator by a small air gap, the improvement comprising:
   rotor bearings radially supporting the motor rotor on the motor shaft preserving the small air gap;
   a torsional spring rotationally transmitting torque between the motor rotor and the motor shaft between the rotor bearings;
   a rotationally balanced torsional spring deformation measurement means transforming a rotational angular difference between the motor rotor and the motor shaft into electrical characteristics;
   a passage through the motor housing transporting electrical conductors between the rotationally balanced torsional spring deformation measurement means and slip rings;
   an electronic circuit transforming the rotationally balanced torsional spring deformation measurement means electrical characteristics into a voltage representing the electric motor torque.

2. The electric motor torque transducer of claim 1 wherein the rotor bearings comprise at least two bearings rotationally supporting the motor rotor on the motor shaft maintaining a constant motor rotor radius for all rotational angular differences between the motor rotor and the motor shaft and preserving a uniform small air gap between the motor rotor and the motor stator.

3. The electric motor torque transducer of claim 1 wherein the torsional spring comprises cylindrical structure attaching the motor rotor to the motor shaft, the torsional spring rotational deformation around the motor shaft being related to torque transmitted between the motor rotor and motor shaft.

4. The electric motor torque transducer of claim 1 wherein the rotationally balanced torsional spring deformation measurement means comprises:
   a reference structure being attached to the motor rotor;
   a pointer structure being attached to the motor shaft;
   electrical sensing elements being attached to the pointer and the reference structures;
the rotationally balanced deformation measurement means measuring, at all rotational speeds, an angular deformation of the torsional spring around the motor shaft.

5. The electric motor torque transducer of claim 4 wherein the reference structure comprises structure being attached to the motor rotor with attached electrical sensing elements and having a mass center on the motor shaft's rotational axis.

6. The electric motor torque transducer of claim 4 wherein the pointer structure comprises structure being attached to the motor shaft between the reference structure and one of the motor shaft's rotational support bearings with attached electrical sensing elements and having a mass center on the motor shaft's rotational axis.

7. The electric motor torque transducer of claim 4 with slip rings connecting the electronic circuit to the electrical sensing elements rotating with the pointer structure and the electrical sensing elements rotating with the reference structure, the electronic circuit first amplifying then demodulating an electrical signal from the electrical sensing elements, the electronic circuit being operative to produce an electrical signal proportional to the torque across the torsional spring.

8. The electric motor torque transducer of claim 1 wherein the passage through the motor housing comprises cylindrical structure between the motor shaft and an inner race of one of the motor shaft's support bearings with cylindrical passages approximately parallel to the motor shaft, the cylindrical passages being used to pass electrical conductors through the motor housing.

* * * * *